May 2, 1967 G. L. TURNER 3,317,143
VACUUM MOTOR OPERATED TETHERED LAWN SPRINKLER
WITH OSCILLATING NOZZLE

Filed Oct. 9, 1964 5 Sheets-Sheet 1

INVENTOR
GEORGE L. TURNER
BY Roy A. Plant
ATTORNEY

INVENTOR
GEORGE L. TURNER
BY Roy A. Plant
ATTORNEY

May 2, 1967 G. L. TURNER 3,317,143
VACUUM MOTOR OPERATED TETHERED LAWN SPRINKLER
WITH OSCILLATING NOZZLE
Filed Oct. 9, 1964 5 Sheets-Sheet 5

INVENTOR
GEORGE L. TURNER
BY Roy A. Plant
ATTORNEY

3,317,143
VACUUM MOTOR OPERATED TETHERED LAWN SPRINKLER WITH OSCILLATING NOZZLE
George L. Turner, Hickory Corners, Mich., assignor to H. B. Sherman Manufacturing Company, Battle Creek, Mich., a corporation of Michigan
Filed Oct. 9, 1964, Ser. No. 402,899
17 Claims. (Cl. 239—189)

The present invention relates broadly to the sprinkling art, and in its specific phases to a tethered vacuum motor assembly operated wave type lawn sprinkler.

Wave type lawn sprinklers, as originally constructed, and as is still common practice, utilize a direct water driven motor (all of the water passes through the motor on its way to the curved tube carrying the sprinkling outlets) to move the sprinkling outlet tube back and forth as it sprinkles the lawn area involved. These motors, however, tend to plug when foreign matter such as rust scales, pieces of grass, small stones and the like get into the inlet end of the hose and are flushed through same into the sprinkler.

To avoid the problems involved in motors of this type I have devised a sprinkler having a vacuum operated motor which operates on part of the water on its way to the sprinkling outlet tube, and same is set forth in my copending patent application filed July 6, 1964, Ser. No. 380,306, now Patent No. 3,266,731.

Wave sprinklers of conventional types, moreover, utilize a motor driven horizontal oscillating tube, pivotally mounted at each end, and supplied with a row of small water outlet holes through which the spraying water is delivered upward in a fan-like pattern. These small holes are also subject to plugging with particles of rust scales, pieces of grass, small stones, et cetera.

Tethered sprinklers of various types have also been proposed, some of which have towing motors completely separate from the sprinkler assembly itself, while others have complex motor driven assemblies built into the sprinkler which commonly is of the rotating spray head type. It was a recognition of the problems and difficulties encountered in both the ordinary wave type lawn sprinklers and the tethered type lawn sprinklers, and the need of a new approach to sprinklers in the tethered field, which led to the conception and development of the present invention.

Accordingly among the objects of the present invention is the production of a tethered lawn sprinkler having some of the characteristics of a wave type lawn sprinkler.

Another object of the present invention is to provide a tethered lawn sprinkler having a wave motion outlet for water without using the conventional wave motion curved tube with its row of tiny water outlet openings through which the spraying water is delivered upward in a fan-like pattern.

Another object of the present invention is the provision of a tethered lawn sprinkler operated by a vacuum driven motor assembly.

Another object of the present invention is the provision of a tethered sprinkler which utilizes a modified form of the vacuum motor in the sprinkler set forth in my above referred to co-pending patent application Ser. No. 380,306, now Patent No. 3,266,731 and wherein the vacuum producing stream is also the sprinkling stream of the tethered sprinkler.

A further object of the present invention is to provide a tethered lawn sprinkler having a motor assembly which supplies a back and forth motion which not only delivers the sprinkling water in an up and over, back and forth, path but at the same time rotates a reel to wind up a tethering cable and move the assembly in a predetermined direction.

A further object is to provide a vacuum motor assembly operated sprinkler of the tethered type wherein the reel is positively driven in one direction to wind the tethering cable on same to move the sprinkler forward and yet said reel is releasable for unwinding said cable when said sprinkler is to be relocated for tethered movement once more.

A further object of the present invention is to provide a tethered lawn sprinkler having a reel on which the tethering cable is wound and wherein means are provided for winding the tethering cable further and further down the reel as the assembly moves forward while towing more and more of the water supplying hose.

A further object is to provide a one-way clutch actuated by a vacuum motor assembly to rotate a reel to gradually wind a tethering cable of a lawn sprinkler on said reel and move the lawn sprinkler forward while delivering sprinkling water in an up and over, back and forth, pattern.

A still further object is to provide a tethered, vacuum motor assembly operated, wave type lawn sprinkler with means for automatically shutting off the water delivered by the lawn sprinkler when an obstruction is encountered as well as at the preset end of its travel.

Still further objects and advantages of this invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of various ways in which the principle of the invention may be used.

Figure 1:
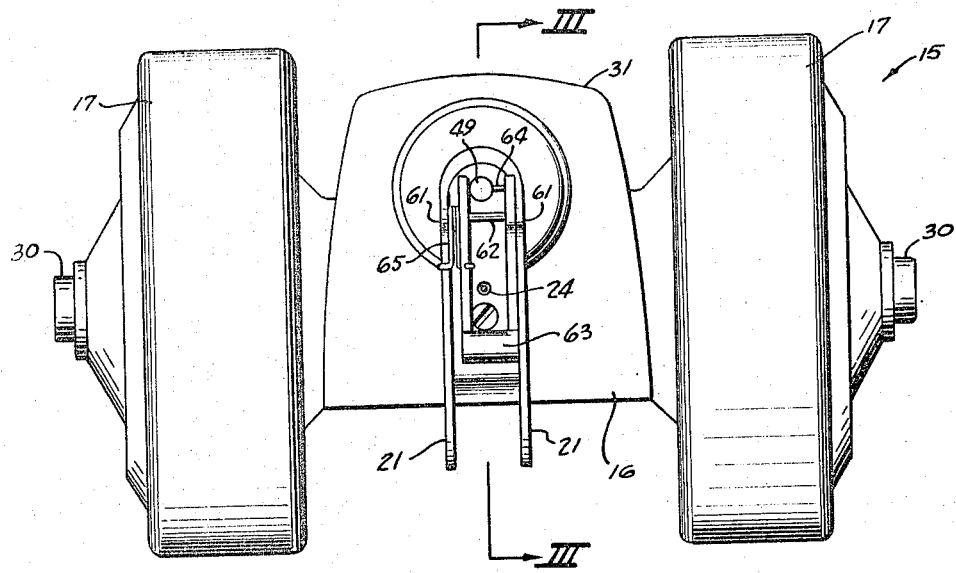
FIGURE 1 shows a front assembly view of the tethered lawn sprinkler of the present invention as taken along line 1—1 of FIGURE 2, looking in the direction of the arrows.
Figure 2:
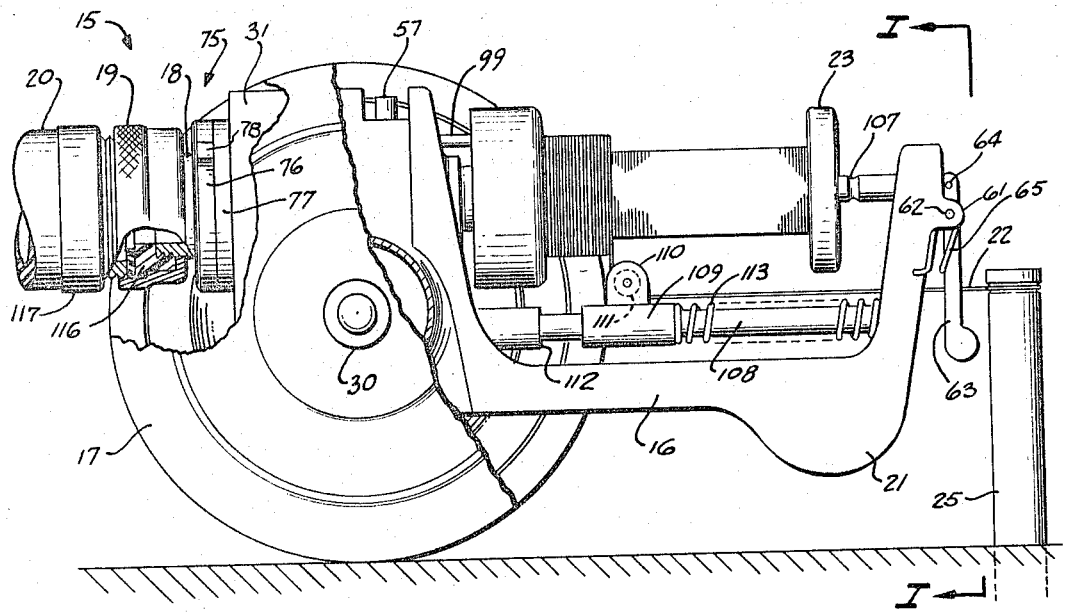
FIGURE 2 shows a side assembly view of the present invention with certain of the parts broken away and in section to facilitate describing same.
Figure 3:
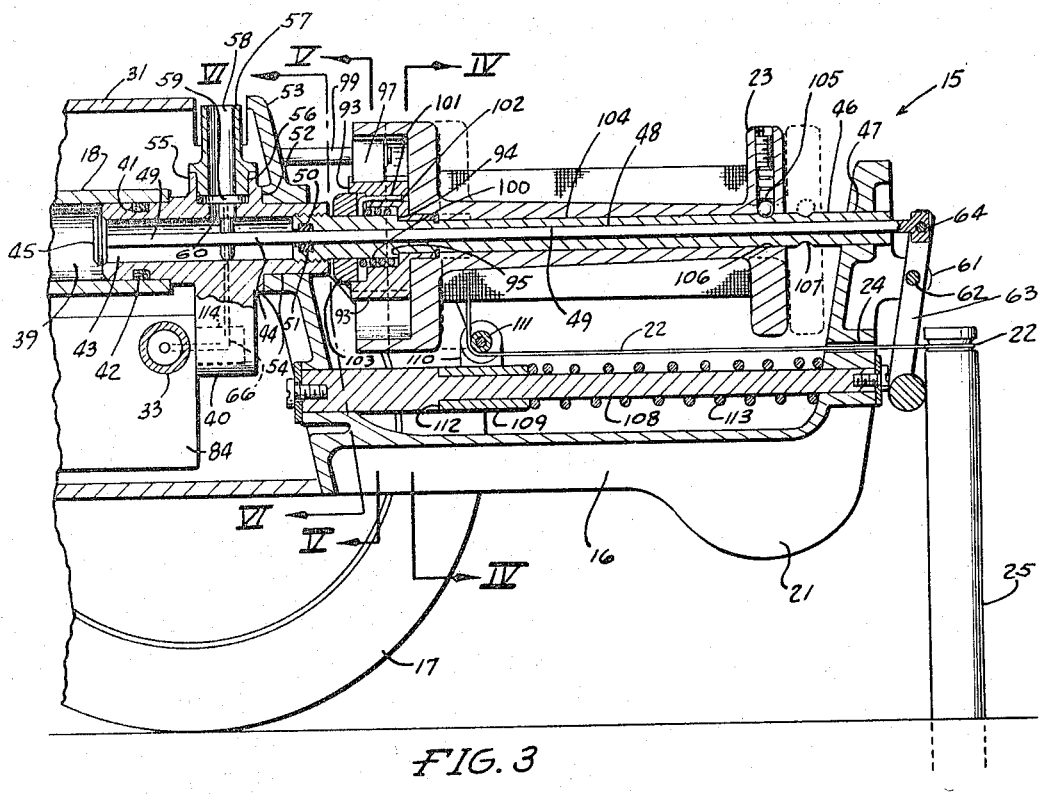
FIGURE 3 shows a fragmentary center longitudinal section of the lawn sprinkler of the present invention as taken along line 3—3 of FIGURE 1, looking in the direction of the arrows, and with the reel shown released when in the dotted position.

Referring more particularly to FIGURES 1, 2 and 3 of the drawings, it will be seen that the present invention involves a vacuum operated lawn sprinkler 15 having a base 16 supported at one end on wheels 17, the mounting of which will be hereinafter described. The base 16 is provided at its rear end with an externally threaded tubular inlet member 18, FIGURE 2, joinable in conventional manner by a connector 116 to the internally threaded female coupling half 19 which, in turn, is connectable to the male coupling half 117 of a hose 20 for supplying water under pressure for operation of and delivery by lawn sprinkler 15. At the lower front end of sprinkler base 16 same is supplied with any conventional form of support with skid 21 being one of the most simple forms it can take, and to be considered as diagrammatic of all the different forms of supporting means which can be used.

A small tethering cable 22 of "nylon," rustproof braided flexible wire, or the like, windable on reel 23 as will be hereinafter explained in detail, passes through a suitable opening 24, FIGURES 1 and 3, in the front end of sprinkler base 16, and extends to a suitable tethering post 25 toward which the lawn sprinkler 15 moves in the course of its operation.

Figure 6:
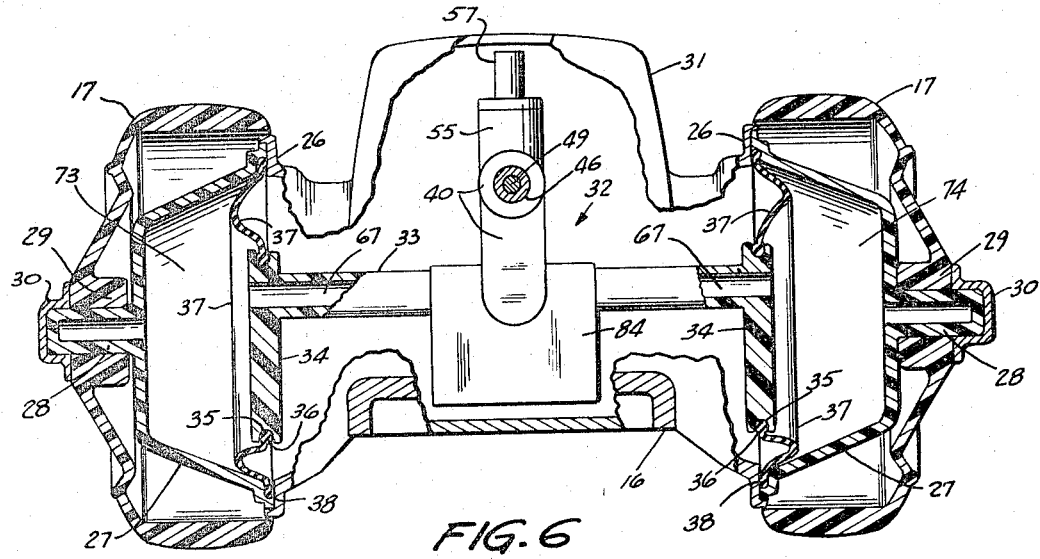
FIGURE 6 shows a fragmentary cross sectional view substantially at the center of the support wheels but with the center portion projected forward so as to be in front of the spraying outlet and approximately along the line 6—6 of FIGURE 3, looking in the direction of the arrows.
Figure 7:
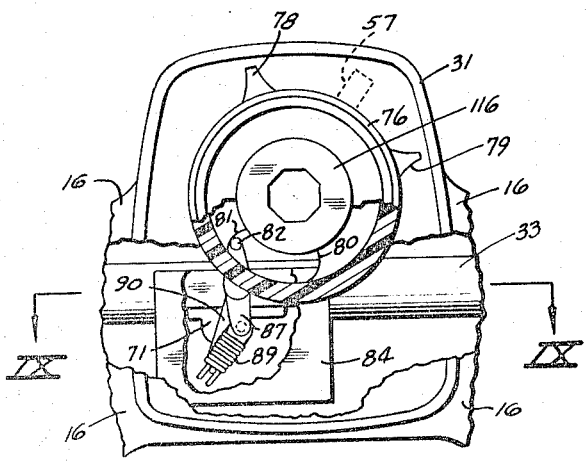
FIGURE 7 shows a fragmentary cross sectional view of the rear portion of the sprinkler assembly, with certain parts broken away for clarity of illustration, and showing the tripping mechanism and associated parts as they approach the tripping point where the sprinkler will instantaneously reverse its direction of sprinkling.
Figure 8:
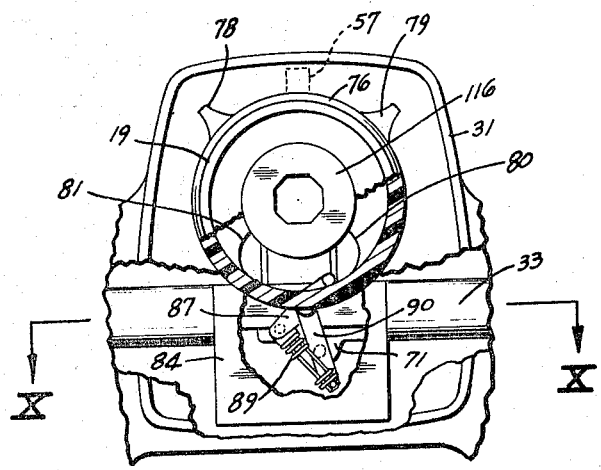
FIGURE 8 shows a similar view to that of FIGURE 7, but with the sprinkling area adjusting members in upright position for sprinkling substantially equally on each side of the sprinkler assembly, and with the tripping mechanism tripped so that the operating valve assembly is shifted to its opposite position for reversing the movement of the sprinkling nozzle travel.

Referring now more particularly to FIGURE 6, it will be noted that the sprinkler base 16 extends sidewise and is provided with circular end flanges 26 on which are snapped or otherwise fastened cover members or diaphragm cups 27 of metal, plastic or the like, carrying coaxial trunnions 28 on which the trunnion bearings 29 of wheels 17 rotatably fit. Flanged caps 30 are conventionally fastened on the outer ends of trunnions 28, as by press fitting, to hold the wheels 17 in place as the lawn sprinkler is moved from place to place. The portion of the lawn sprinkler between wheels 17 is preferably provided with a cover member 31 which can be installed in any conventional manner.

Mounted inside of sprinkler base 16 between wheels 17 and within cover member 31 is a vacuum motor assembly 32, details of which are illustrated in various ways and positions in FIGURES 3, and 6 to 13 inclusive. This vacuum motor assembly 32 has a diaphragm axle 33 having an enlarged center portion, and with the outer ends of said diaphragm axle having perpendicularly mounted thereon substantially round discs 34 provided with peripheral grooves 35 for the tight fitting reception of center bead 36 of diaphragm 37 which in turn has an outer peripheral bead 38 tightly sealed in a suitable groove in cover member 27 on one side with its other side sealed against the circular flange 26 on the outer end of sprinkler base 16 adjacent wheels 17. In the actual operation of the lawn sprinkler 15, this diaphragm axle 33 moves back and forth in endwise direction while connected to body member 40 to rotatably oscillate same for a purpose to be hereinafter explained in detail.

Now turning to FIGURES 2 and 3, the inlet member 18 has a passageway 39 extending full length of same, and closely but rotatably fitting into the end of this passageway 39 is a body member 40 which is provided with a peripheral groove 41 containing an O-ring 42 to form a liquid tight seal between inlet member 18 and body member 40. This body member 40 is provided with a longitudinal passageway 43 closable at its inlet end by means of a valve 44 with seating head 45, the operation of which will be hereinafter described. During operation of the lawn sprinkler 15, this valve is in open position.

Body member 40, FIGURE 3, is internally threaded at its end opposite to its inlet end and the externally threaded end of a spindle 46 is tightly screwed into the threaded end of same. The outer end of this spindle passes through opening 47 in the upturned forward end of sprinkler base 16. Spindle 46 has a passageway 48 full length of same and through which the stem 49 of valve 44 slidably fits for a purpose to be hereinafter described. At the threaded end of spindle 46 same is provided in conventional manner, as diagrammatically shown, with an internal groove 50 containing an O-ring 51 to substantially prevent fluid leakage along stem 49 of valve 44 in spindle passageway 48.

Again referring to FIGURE 3, body member 40 is provided with a shoulder 52 which rotatably fits against sprinkler base 16 intermediate end member 53 where body member 40 passes through bore 54 of said end member 53, thus facilitating rocking back and forth of said body member 40 in said bore 54 for a purpose to be described.

Body member 40 is provided with a boss or side projection 55, the outer end of which is provided with a counterbore 56 into which is press fit or otherwise fastened a nozzle member 57 having a venturi passageway 58 lengthwise of same. Nozzle member 57 extends part way to the bottom of counterbore 56 so as to provide a vacuum chamber 59 in body member 40 at the inner end of nozzle member 57. Extending from passageway 43 in body member 40 into said vacuum chamber 59 and in alinement with venturi passageway 58 is an outlet 60 from passageway 43. This outlet 60 is approximately of the same cross sectional size as passageway 58. The flowing of fluid, such as water, under pressure through passageway 43 in body member 40 and then out through outlet 60 and venturi passageway 58 creates, in conventional manner, a vacuum in vacuum chamber 59, the use of which will be hereinafter described.

The forward end of base 16, FIGURES 2 and 3, adjacent opening 47 therein, is provided with a pair of spaced apart ears 61 carrying a pivot pin 62 on which is pivotally mounted a valve actuator 63, the upper end of which is loosely connected through pivot pin 64 to the outer end of valve stem 49, the head 45 of which is preferably anchorable on stem 49 in manner facilitating assembly of the lawn sprinkler. A spring 65, FIGURES 1 and 2, normally holds head 45 of valve 44 away from its seat on the end of body member 40 so that fluid, such as water, under pressure can flow through inlet member 18, around valve head 45 into body member 40 and out through nozzle member 57 while creating a vacuum in vacuum chamber 59. However, when the tethered lawn sprinkler reaches the end of its travel, and the valve actuator 63 contacts an obstruction or tethering post 25, this moves valve actuator 63 from its position shown in FIGURE 2 to that shown in FIGURE 3 and in doing so, moves valve 44 to the right and its head 45 then closes the inlet end of body member 40 as shown to shut off the water flow through the sprinkler assembly.

Referring again to FIGURE 3, it will be noted that flowing water under pressure through passageway 39 in inlet member 18 into longitudinal passageway 43 in body member 40 and out of same through outlet 60 into and through venturi passageway 58 in nozzle member 57 creates a vacuum in vacuum chamber 59, and it is this vacuum which is used to operate the tethered lawn sprinkler vacuum motor assembly 32. Vacuum chamber 59 is connected through tubular passageway 66 in body member 40 to the diaphragm axle 33 as will be hereinafter described. This diaphragm axle 33 has a longitudinal passageway 67, FIGURE 6, therein and is provided with a stop portion 68 intermediate of its ends, FIGURES 9, 10 and 11, with passageway 66 terminating substantially at the midpoint of same. The diaphragm axle 33 also carries openings 69 and 70 in said stop portion 68 at opposite sides of the end of passageway 66 in diaphragm axle 33. These openings 69 and 70 opening, respectively, into longitudinal passageway 67 in diaphragm axle 33 at opposite sides of said stop portion 68.

Figure 9:
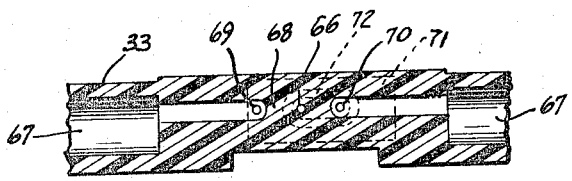
FIGURE 9 shows a sectional view as taken along line 9—9 of FIGURE 7, looking in the direction of the arrows.
Figure 10:
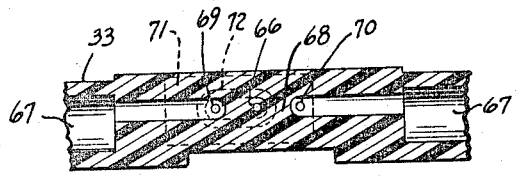
FIGURE 10 shows a sectional view as taken along line 10—10 of FIGURE 8, looking in the direction of the arrows.
Figure 11:
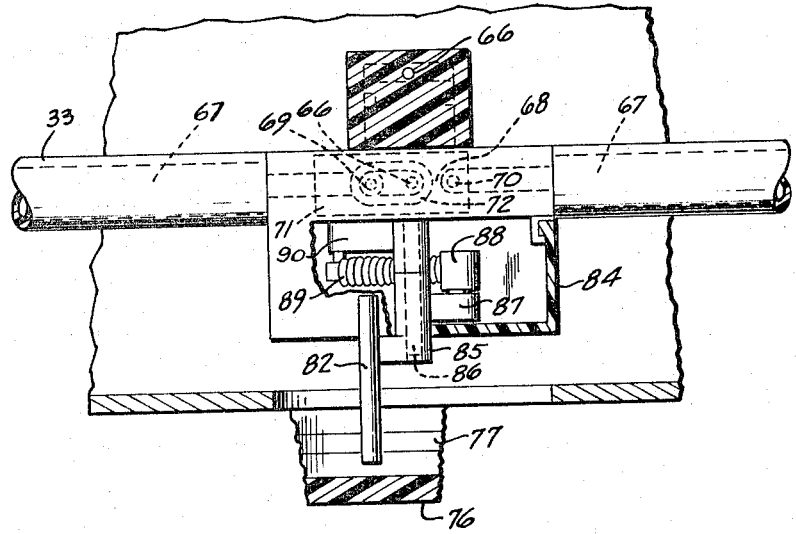
FIGURE 11 shows a fragmentary view from above the top of the valve housing, with certain of the parts broken away or in section.
Figure 12:
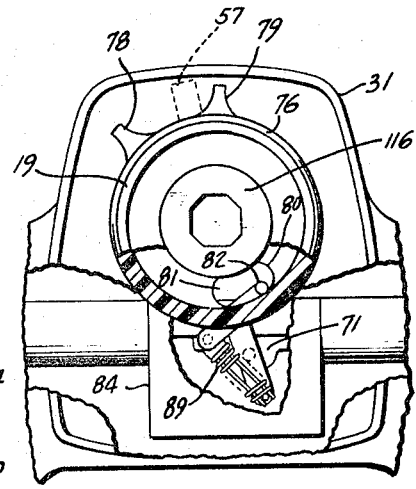
FIGURE 12 shows a fragmentary rear view of the housing with parts broken away to better illustrate a different adjustment position of the spraying control ring members as well as the position of the operating valve assembly which is the same as shown in FIGURE 8.
Figure 13:
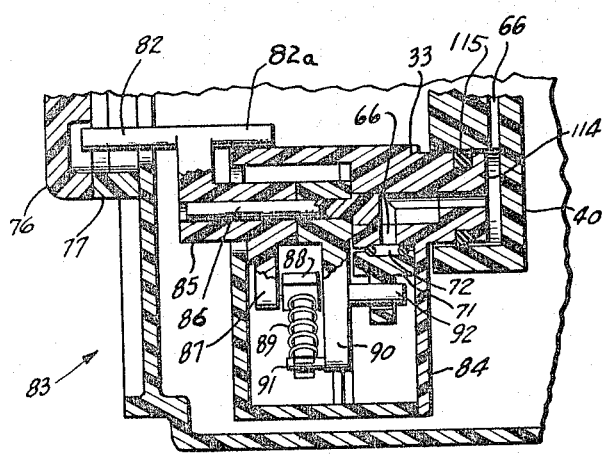
FIGURE 13 shows a fragmentary vertical sectional view illustrating the position of certain of the motor assembly operating parts relative to others with most of the parts being shown in section.

Shiftably mounted over the portion of diaphragm axle 33 carrying said openings 69 and 70 is a valve shoe 71, FIGURE 13, carrying a valve face member 72, preferably made of rubber so that as the shifting mechanism operates to move valve shoe 71 from one position to the other, this valve face member 72 will first be lifted slightly and then lowered again for sealing when it shifts from one position where passageway 66 is connected to opening 70, FIGURE 9, to its other sealed position where passageway 66 is connected to opening 69, FIGURE 10, and in doing so will direct the suction pressure from passageway 66 to the other opening (69 or 70) for operating the particular connected vacuum motor 73 or 74. This shifting of valve shoe 71 from one position to the other to connect either opening 69 or 70 to suction passageway 66 uncovers and opens the other opening (69 or 70) not included in the connected pair and thus breaks the vacuum to the vacuum motor connected to the disconnected opening (69 or 70) thus reversing the direction of endwise movement of diaphragm axle 33 and with it the direction of pivotal movement of sprinkling nozzle member 57.

The sprinkling direction controller 75, FIGURE 2, used in this tethered sprinkler construction is similar to that shown in my Patent No. 3,045,923, and that in my co-pending patent application Ser. No. 380,306, now Patent No. 3,266,731, in that it has two frictionally held adjustable ring members 76 and 77, FIGURE 2, with upwardly extending adjusting members 78 and 79, respectively, FIGURES 7, 8 and 12, the positioning of which relative to each other and inlet member 18 will determine whether the sprinkling is of maximum width, a narrower width, centered, or at one side or the other of the sprinkler assembly. This is accomplished by grooving the lower face of adjustable ring members 76 and 77 with the ends 80 and 81, respectively, of these grooves forming a stop for a rearward projecting arm 82 of the reversing assembly 83, FIGURE 13. The reversing assembly 83 is preferably located in a housing member 84, having a removable cover portion, to protect same. This arm 82 has a forward projecting end 82a for limiting the extent of movement of same by contacting the top of housing 84, FIGURE 13, at each end of its travel, and it also has a sidewise projecting pivoted bearing member 85 mounted on stub shaft 86 carried by diaphragm axle 33. A rotary connector 114 on the side of diaphragm axle 33 fits into the side of the lower portion of body member 40 with a conventional gasket, such as an O-ring 115, to prevent leakage when diaphragm axle 33 moves back and forth and oscillates body member 40. The pivotally mounted bearing member 85 has a forward projecting arm 87 carrying on its outer end a conventionally pivoted mounting 88 for one end of a compression spring 89.

Also pivotally mounted on stub shaft 86 is a second forward projecting arm 90, FIGURE 13, which carries on its outer end a pivotal mounting means 91 for the second or outer end of compression spring 89. That arm 90 carries on its side opposite to said spring a bearing shaft 92 on which is pivotally mounted valve shoe 71 with its face member 72 which is used to connect center opening 66 first to opening 69 and then to 70, or vice versa, for delivering vacuum operating suction pressure to said vacuum motors 73 and 74, FIGURE 6. It is thus to be seen that as the vacuum motor assemblies operate to move diaphragm axle 33 in one direction, this brings rearward projecting arm 82 up against end 80 or 81 of the corresponding slots in adjustable ring members 76 and 77 of sprinkling direction controller 75. As the diaphragm axle 33 continues to move this acts through the corresponding end 80 or 81 in the noted slots actuating arm 82 to move forward projecting arm 87 relative to a second forward projecting arm 90 until they pass dead center with each other. At this point compression spring 89, which has been compressed during this relative movement of arms 87 and 90, snaps forward projecting arm 90 to its opposite pivotal position, and during its movement it slightly lifts valve shoe 71 and moves it from the position shown in FIGURE 9 to that of FIGURE 10, or vice versa, and drops it down again for vacuum sealing and which instantly shifts the applied vacuum from one vacuum motor to the other, while uncovering and opening to the atmosphere the previously covered vacuum inlet opening to release the vacuum previously applied through same to its vacuum motor so that the diaphragm axle 33 can then shift sidewise in the opposite direction as described. This rotates body member 40 with its outlet nozzle 57 first in one direction and then the other, within the limits set by the controller ring members 76 and 77, to thus give the back and forth, up and over, wave action sprinkling motion of nozzle member 57.

Figure 5:
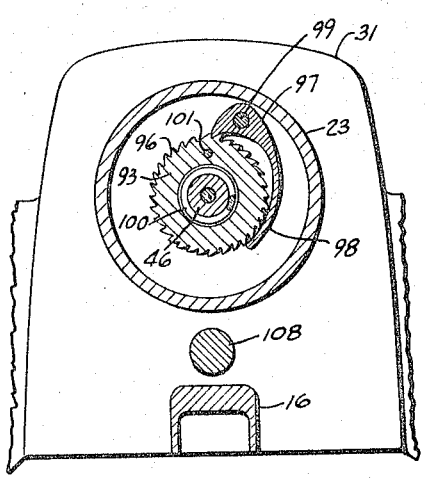
FIGURE 5 shows a sectional view as taken along line 5—5 of FIGURE 3, looking in the direction of the arrows, and showing the ratchet dog engaged with the drive ratchet.
Figure 4:
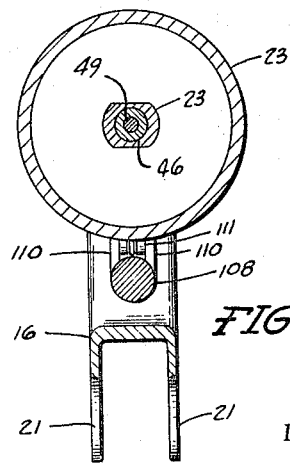
FIGURE 4 shows a sectional view as taken along line 4—4 of FIGURE 3, looking in the direction of the arrows.

Mounted on spindle 46, FIGURE 3, adjacent the end of the body member 40 is a sleeve 93 freely fitting said spindle and having a shoulder 94 fitting against shoulder 95 of said spindle. Sleeve 93 is provided on its outer surface with ratchet teeth 96, FIGURE 5, engaged by a ratchet dog 97 having spring tail end 98 which holds the ratchet dog in engagement with the ratchet teeth 96 while permitting ratcheting action. This ratchet dog is pivotally mounted on a pivot pin 99 which, in turn, is rigidly anchored on the intermediate end member 53 of base 16, FIGURE 3. Mounted inside of a short counterbore in the end of sleeve 93 and around spindle 46 is a cylindrical coil spring 100 tightly fitting said spindle, and with one end 101 of said spring fitting and being anchored in an opening 102 in sleeve 93, FIGURE 3. An annular ring plug 103 may be used as shown to close the outer end of the counterbore in sleeve 93. The forward end of sleeve 93 extends into the inner bore 104 of reel 23 for a short distance with this forward end of sleeve 93 and the matching portion of the inner bore 104 of reel 23 being splined for rotation in unison. This splining, as shown in FIGURE 4, is of a double flat face form which is to be considered as diagrammatic of splines in general, any of which can be used at this point. Reel 23 is preferably provided with a spring loaded detent 105, FIGURE 3, and spindle 46 is provided with a pair of circumferential grooves 106 and 107 for engagement with said detent. When detent 105 is in engagement with groove 106 of spindle 46, this spindle and sleeve 93 are locked into engagement for rotation in unison. On the other hand, when reel 23 is moved to its dotted position, FIGURE 3, its detent 105 will be in engagement with groove 107 of spindle 46 where the reel will be disengaged from said splined connection and freely rotatable for the unwinding and removal of tethering cable 22 from reel 23 to the extent necessary for resetting the sprinkler 15 for tethered operation once more, and at which time reel 23 will be moved back to its position shown in solid lines for positive driving once more. It is thus to be noted that as nozzle member 57 moves in one direction the reel 23 through action of spring 100, ratchet teeth 96 on sleeve 93, and ratchet dog 97 in engagement with said teeth will rotate reel 93, while on the reverse movement of nozzle member 57 spring 100 will relax by slightly unwinding and slide on spindle 46 without moving same. Spring 100 and the cooperating parts thus act as a one-way clutch in rotating reel 23. Alternate back and forth movements of nozzle member 57 thus will gradually rotate reel 23 in one direction to wind tethering cable 22 on reel 23.

At the start of operation of the tethered sprinkler, the water supply hose 20 would preferably be coiled or otherwise present behind the sprinkler 15 so that as the sprinkler moves forward due to the tethering cable 22 being wound on reel 23, the length of the piece of hose 20 being dragged behind the sprinkler increases and the pulling load also increases due to ground friction, a thing which the present invention takes advantage of, as will now be explained.

Referring more particularly to FIGURES 2 and 3, it will be noted that there is a shaft 108 conventionally mounted on sprinkler base 16 substantially parallel to spindle 46. On this shaft 108 is slidably mounted a sleeve member 109 having ears 110 on which is mounted a pulley 111 around which tethering cable 22 passes, as shown, to reel 23. This sleeve member 109 is urged to its retracted position up against shoulder 112, FIGURE 3, by compression spring 113 at the start of operating the tethered sprinkler and at which point tethering cable 22 will start being wound at the left-hand end of reel 23. As more and more water supply hose 20 is dragged behind the sprinkler 15, as same moves forward, the pulling load on the tethering cable 22 increases and this in turn gradually moves sleeve member 109 along shaft 108, FIGURE 2, as spring 113 is progressively compressed so that the winding of the tethering cable 22 progresses down reel 23, as shown.

It is thus to be seen that with the tethered lawn sprinkler 15 set in position to water a prescribed area with the hose 20 coiled up behind same and the tethering cable 22 stretched from the sprinkler to a tethering post 25, the turning on of the sprinkling water will operate the vacuum motors 73 and 74 to swing nozzle member 57 back and forth as limited by the setting of the controller ring members 76 and 77 which actuate the reversing assembly 83. This in turn will actuate the one-way clutch to rotate reel 23 and gradually wind tethering cable 22 on same and thus slowly move the tethered lawn sprinkler forward along the prescribed path of sprinkling, at the end of which valve actuator 63 will come up against tethering post 25 and move valve 44 to the right so that its head 45 will close the inlet end of body member 40, FIGURE 3, to shut off the water which operates the tethered sprinkler.

Other modes of applying the principle of my invention may be employed instead of the one explained, change being made as regards the article and combinations herein disclosed, provided the means stated by any of the following claims or the equivalent of such stated means be employed.

I therefore particularly point out and distinctly claim as my invention:

1. A lawn sprinkler comprising a vacuum producing means, a vacuum operated motor assembly having an endwise movable diaphragm axle, means operably connecting the vacuum from said vacuum producing means to said diaphragm axle of said motor assembly for reversibly moving said axle in endwise direction, a tethering means, and means connecting said motor assembly to said tethering means for actuating same.

2. A lawn sprinkler comprising a vacuum producing means, a vacuum operated motor assembly, means operably connecting the vacuum from said vacuum producing means to said motor assembly, a tethering means, and means connecting said motor assembly to said tethering means for actuating same, wherein said tethering means includes a reel, and a tethering cable windable on said reel, and said means for connecting said motor assembly to said tethering means includes a clutch means which will rotate said reel in one direction in step with the operation of said motor assembly.

3. A lawn sprinkler as set forth in claim 2, wherein said tethering means also includes means for guiding said tethering cable so that same is wound progressively down said reel as said sprinkler is moved forward by said tethering means.

4. A lawn sprinkler as set forth in claim 3, wherein said means for guiding said tethering cable as it is wound on said reel comprises a shaft spaced from but substantially parallel to said reel, a sleeve member slidable on said shaft, a pulley mounted on said sleeve for guiding said tethering cable on its way to said reel, said pulley having its axis substantially perpendicular to a plane including the axis of said reel and said shaft, and a suitable spring resisting movement of said sleeve member, with its tethering cable pulley, from opposite one end of said reel toward the other end of same as said tethering movement progresses.

5. A lawn sprinkler comprising a vacuum producing means, a vacuum operated motor assembly, means operably connecting the vacuum from said vacuum producing means to said motor assembly, a tethering means, and means connecting said motor assembly to said tethering means for actuating same, wherein said vacuum motor assembly has a pair of diaphragms, a diaphragm connecting means, means joining said diaphragms to said diaphragm connecting means with one on each end of same, a compartment at each end of said diaphragm connecting means with each compartment closed by one of said diaphragms, and wherein said vacuum connecting means includes means for connecting first one of said compartments and then the other to the vacuum produced by said vacuum producing means while releasing the other to atmosphere to thus actuate said diaphragm connecting means.

6. A lawn sprinkler as set forth in claim 5, wherein said diaphragm connecting means is a diaphragm axle having a passageway therein at each end of same opening into the corresponding compartment of said pair of compartments, and wherein said connecting means includes a valve means connecting first one of said passageways and then the other to said vacuum produced by said vacuum producing means to thus move said diaphragm axle first in one direction and then the other.

7. A lawn sprinkler having as part of same a vacuum producing means, a spraying nozzle connected to said vacuum producing means, and a pair of fixed edge symmetrically flexing diaphragms with connecting means for moving said spraying nozzle in a predetermined sprinkling pattern with one of said flexing diaphragms moving said nozzle in one direction and the other moving said nozzle in the opposite direction, said vacuum producing means and said spraying nozzle being connected in series with each carrying all of the fluid passing through said sprinkler.

8. A lawn sprinkler as set forth in claim 7, wherein said flexing diaphragms and connecting means forms a vacuum operated motor assembly, means operably connecting the vacuum from said vacuum producing means to said vacuum operated motor assembly, means for continuously reversing the direction of operation of said vacuum operated motor assembly, and means joining said spraying nozzle connected to said vacuum producing means to said vacuum operated motor assembly so that the reversing of the operation of said motor assembly will pivotally move said nozzle back and forth in a predetermined spraying pattern.

9. A lawn sprinkler comprising a vacuum producing means, a vacuum motor assembly having a diaphragm axle with a flexing diaphragm on each end of same, a fixed position compartment at each end of said diaphragm axle with said diaphragm closing same, a spraying nozzle, said vacuum producing means and said spraying nozzle being fixedly connected in series with each carrying all of the fluid passing through said sprinkler, means connecting said vacuum operated motor to said spraying nozzle for spraying movement in unison therewith, and a valve including means connecting said vacuum producing means to said vacuum motor assembly for alternately applying said vacuum to first one of said compartments and then the other for moving said diaphragm axle and spraying nozzle in a back and forth path.

10. A lawn sprinkler as set forth in claim 9, wherein there is an adjustable position means which actuates said means connecting said vacuum producing means to said vacuum motor assembly to trip said connecting means and reverse the direction of movement of said spraying nozzle at the predetermined ends of said back and forth movement.

11. A lawn sprinkler as set forth in claim 9, wherein said lawn sprinkler has a tethering means including a reel and a tethering cable, means connecting said vacuum motor assembly to said reel for rotating same to wind said tethering cable thereon, and means anchoring the outer end of said tethering cable so that as said tethering cable is wound on said reel said lawn sprinkler will be pulled toward said means anchoring the outer end of said cable.

12. A lawn sprinkler as set forth in claim 11, wherein said lawn sprinkler has a shut off means for said fluid, and means on the forward end of said lawn sprinkler to actuate said shut off means when said actuating means comes in contact with said anchoring means and then moves forward to complete the closing of said shut off means.

13. A vacuum motor operated lawn sprinkler of moving nozzle outlet and tethering cable mechanism type, wherein all of the sprinkling water passes through said nozzle and a vacuum producing means, and in doing so produces the vacuum which operates said motor, means connecting said vacuum producing means to said vacuum motor in manner actuating same alternately first in one direction and then the other, and wherein said motor moves said nozzle in a predetermined spraying pattern and actuates said tethering mechanism, said tethering mechanism having a one-way clutch, a spool rotatable in one direction by said clutch, means for disengaging said spool, and means for winding said tethering cable gradually from one end of said spool to the other.

14. A lawn sprinkler comprising a vacuum producing means, a vacuum motor assembly, a spray nozzle, said vacuum producing means and said spray nozzle being connected in series with each carrying all of the fluid passing through said sprinkler, means pivotally mounting said spray nozzle on a substantially horizontal axis of rotation, means connecting said vacuum operated motor to said pivotally mounted spray nozzle for spraying movement in unison with movement of said motor, a valve including means connecting said vacuum producing means to said vacuum motor assembly, means for shifting said valve so as to direct said vacuum to said vacuum operated motor assembly first in one direction and then the other to alternate its direction of movement and with it the direction of movement of said spray nozzle, tethering means including a reel and a tethering cable, a one-way clutch means connecting said reel to said vacuum motor assembly for gradually winding said tethering cable on said reel under normal operating conditions, means for guiding said tethering cable to said reel in manner permitting gradual winding of said tethering cable on said reel from one end toward the other, means for disengaging said reel to facilitate unwinding said tethering cable from same, and valve including means for automatically shutting off fluid flow through said vacuum producing means and spray nozzle when said lawn sprinkler reaches the end of its tethered travel.

15. A vacuum operated lawn sprinkler of arcuate moving open ended tubular nozzle outlet type with said nozzle having a longitudinal axis, a vacuum producing means at the inlet end of said nozzle, pivot means for said nozzle and vacuum producing means, said pivot means being hollow and having an axis of rotation substantially perpendicular to the longitudinal axis of said tubular nozzle, means connecting said nozzle and vacuum producing means through said hollow pivot means to a source of water under sprinkling pressure so that all of the sprinkling water passes through said vacuum producing means and nozzle and in doing so produces the lawn sprinkler operating vacuum, a vacuum motor adjacent said pivot means, said pivot means having an operating arm extending from same substantially in line with the longitudinal axis of said tubular nozzle but at the opposite side of said axis of rotation of said pivot means, said vacuum motor having a diaphragm axle, means pivotally connecting said operating arm to said diaphragm axle substantially at the longitudinal center of the latter, said nozzle pivoting means and said operating arm having a tubular passageway connected at one end to said vacuum producing means, said diaphragm axle having passageways extending from each end of same and terminating in separate outlets adjacent each other and adjacent said longitudinal center of said diaphragm axle, means connecting first one and then the other of said diaphragm axle passageways to the said vacuum producing means through said tubular passageway in said nozzle pivoting means and operating arm while releasing to atmosphere the disconnected passageway, means connected to said diaphragm axle at its ends with said means including flexing diaphragm means sealed to said axle and extending outward from same, means having a vacuum receiving compartment at each end of said diaphragm axle with each of said compartments being closed except at the end adjacent the corresponding end of said diaphragm axle, and means joining the outer edge of said diaphragm means to the open end of said vacuum receiving compartment, whereby application of said vacuum to first one of said vacuum receiving compartments and then the other through said passageways in said diaphragm axle will through said operating arm move said diaphragm axle first one way and then the other relative to said vacuum receiving compartments which in turn will pivotally move said nozzle back and forth in sprinkling pattern.

16. A lawn sprinkler as set forth in claim 15, wherein said lawn sprinkler has a tethering means for moving same along a path to be sprinkled.

17. A lawn sprinkler as set forth in claim 15, wherein said moving nozzle pivot which is substantially perpendicular to the longitudinal axis of said nozzle is also substantially horizontal, said vacuum operated motor with its flexible diaphragm means is substantially annular and said diaphragm axle has symmetrical disc ends with said annular flexible diaphragm means forming said vacuum receiving compartment closing means, stub axle means at the outer ends of said means having said vacuum receiving compartments, and wheels anchored on said stub axles for supporting said lawn sprinkler.

References Cited by the Examiner

UNITED STATES PATENTS

| | | | |
|---|---|---|---|
| 2,057,217 | 10/1936 | Soper | 239—189 |
| 2,426,603 | 9/1947 | Freygang | 239—239 |
| 2,597,366 | 5/1952 | Nordenstam | 239—239 |
| 3,043,520 | 7/1962 | Nelson | 239—189 |
| 3,045,923 | 7/1962 | Turner | 239—230 |
| 3,085,751 | 4/1963 | Warrick et al. | 239—191 X |
| 3,091,397 | 5/1963 | Wynstra | 239—190 X |
| 3,175,770 | 3/1965 | Johnson | 239—191 X |

FOREIGN PATENTS 188,956    3/1957    Austria.

M. HENSON WOOD, JR., *Primary Examiner.*

V. C. WILKS, *Assistant Examiner.*